United States Patent [19]

Entringer et al.

[11] Patent Number: 4,573,318

[45] Date of Patent: Mar. 4, 1986

[54] EXHAUST ELBOW FOR MARINE PROPULSION SYSTEM

[75] Inventors: David C. Entringer; David J. Gruenwald; Dale K. Felix, all of Oshkosh, Wis.

[73] Assignee: Brunswick Corporation, Skokie, Ill.

[21] Appl. No.: 694,948

[22] Filed: Jan. 25, 1985

[51] Int. Cl.[4] .............................................. F01N 3/04
[52] U.S. Cl. .......................................... 60/310; 440/89
[58] Field of Search ............................ 60/310; 440/89

[56] References Cited

U.S. PATENT DOCUMENTS

| | | | |
|---|---|---|---|
| 3,541,786 | 11/1970 | Sarra | 60/310 |
| 3,765,479 | 10/1973 | Fish | 60/310 |
| 3,798,904 | 3/1974 | Gleason | 60/310 |
| 3,921,398 | 11/1975 | Kashmerick | 60/310 |

*Primary Examiner*—Douglas Hart
*Attorney, Agent, or Firm*—Andrus, Sceales, Starke & Sawall

[57] ABSTRACT

A marine propulsion system (2) is provided with an exhaust elbow (10) having an intake exhaust passage (22) extending upwardly from the engine (4) and communicating through a bend (24) with a discharge exhaust passage (26), and a water jacket (27) having pockets around the exhaust passages for cooling the latter. A central channel (44) extends longitudinally along the exterior of the exhaust passages to guide water therealong to the end (42) of the discharge exhaust passage to mix with exhaust thereat. The central channel has a pair of sidewalls (50 and 52) extending longitudinally and laterally tapered away from each other (54 and 56) at the outer end of the discharge exhaust passage to create an outward draw from the central channel to minimize break-up of longitudinally outward water flow and maintain the end tip of the discharge exhaust passage dry and prevent water ingestion and creeping back into the discharge exhaust passage due to pulsations of the engine. Dam and port structure is also provided enabling faster heating of the exhaust passage and in turn minimizing condensation within the elbow which may otherwise ingest back into the engine.

21 Claims, 9 Drawing Figures

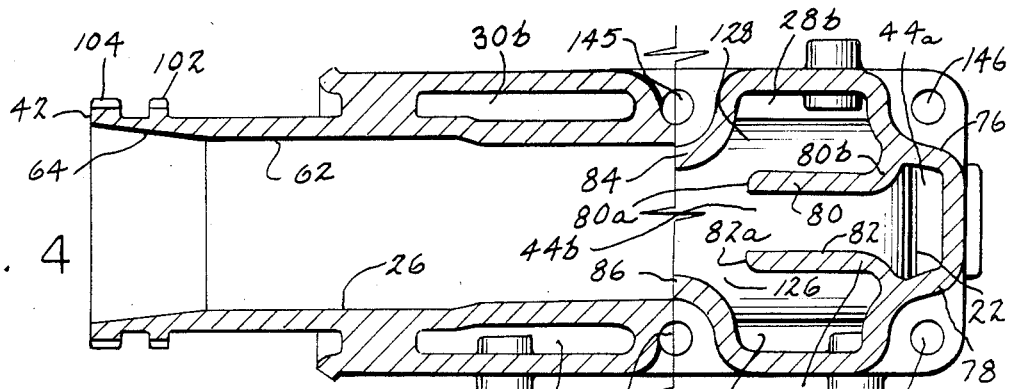
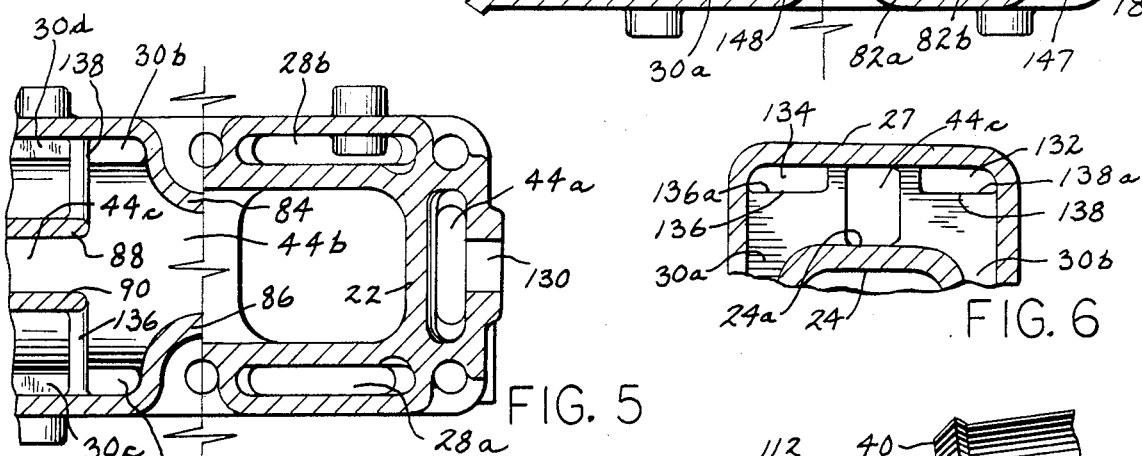
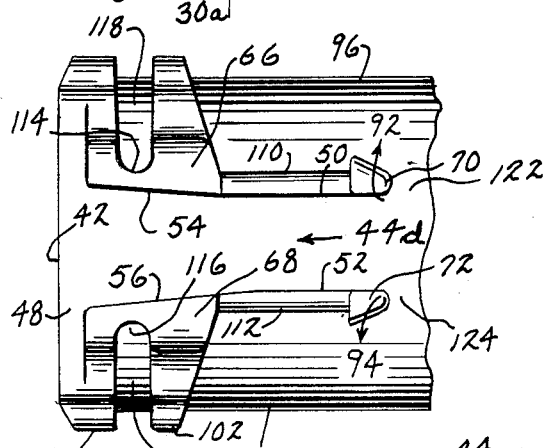
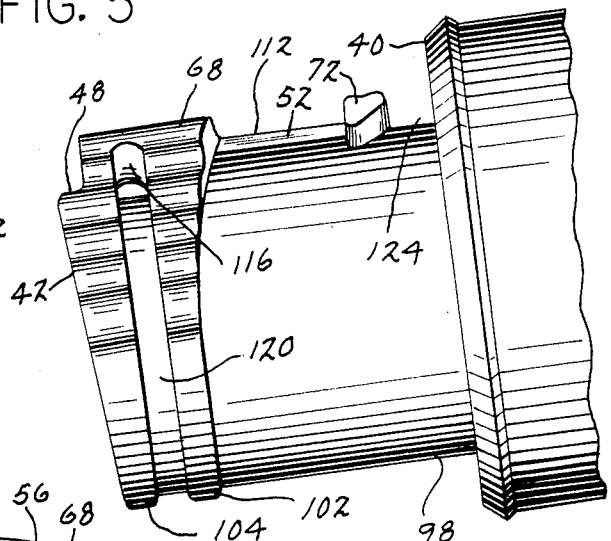
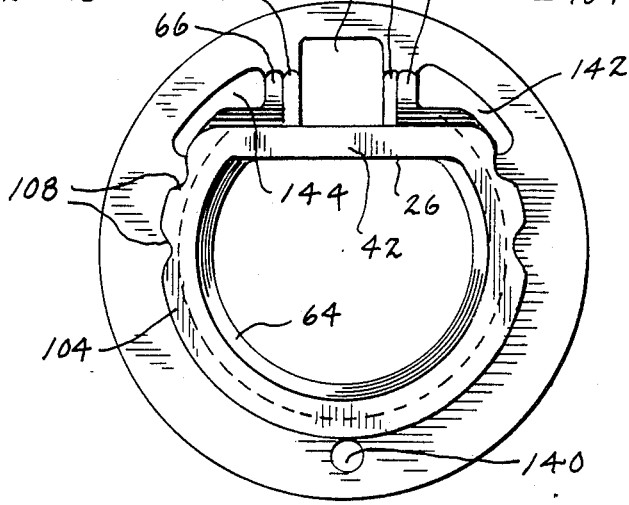

EXHAUST ELBOW FOR MARINE PROPULSION SYSTEM

BACKGROUND AND SUMMARY

The invention relates to marine propulsion systems having an exhaust elbow extending from the engine and discharging engine coolant water into the engine combustion product exhaust.

Various exhaust elbows for marine propulsion systems are known, for example as shown in Sarra U.S. Pat. No. 3,541,786. The elbow extends from the engine manifold and has separate intake passages for exhaust and for water. The elbow discharges mixed exhaust and water.

Water ingestion is a significant problem in exhaust elbows for marine propulsion systems. Engine pulsations due to reciprocating piston movement tends to suck any water within or at the outer tip of the elbow back into the engine, which is undesireable. Water can tend to collect at the discharge end tip of the elbow where coolant water is discharged into the exhaust to mix therewith. Water or moisture deposited or formed at this outer tip end actually travels backwards into the interior of the exhaust passage within the elbow in a pulsating manner and eventually back into the engine. This pulsating ingestion becomes more pronounced with increasing engine size.

Besides the water formation at the outer end discharge tip, water ingestion can also be caused by condensation within the exhaust passage of the elbow. This condensation is due to the temperature differential between the hot exhaust passage within the elbow and the cooler water jacket therearound.

The present invention addresses and solves the above noted problems. The invention minimizes water deposits at the outer discharge tip end of the elbow. The invention also minimizes condensation within the elbow.

BRIEF DESCRIPTION OF THE DRAWINGS

FIG. 4 is a sectional view taken along line 4—4 of FIG. 3.

FIG. 5 is a sectional view taken along line 5—5 of FIG. 3.

FIG. 6 is a sectional view taken along line 6—6 of FIG. 3.

FIG. 7 is a top view taken along line 7—7 of FIG. 3.

FIG. 8 is an enlarged side elevation view of the left portion of the structure in FIG. 3.

FIG. 9 is an end elevation view taken along line 9—9 of FIG. 3.

DETAILED DESCRIPTION

Figure 1:
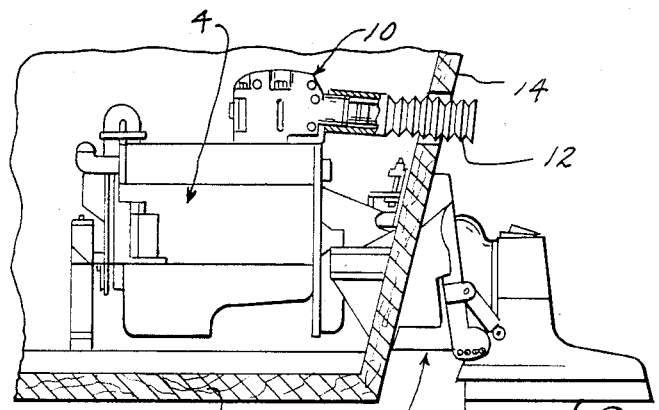
FIG. 1 is a view of a marine propulsion system with an exhaust elbow in accordance with the invention.

FIG. 1 shows a marine propulsion system 2 having an internal combustion engine 4 drivingly connected to a propeller 6 for propelling boat 8. The engine and exhausted through a water jacketed exhaust elbow 10 and exhaust bellows tube 12 through the transom 14, or lower gear case 16, or the like, of the boat. As in the noted Sarra U.S. Pat. No. 3,541,786, combustion product exhaust and coolant water are discharged upwardly into respective passages in the exhaust elbow.

Figure 2:
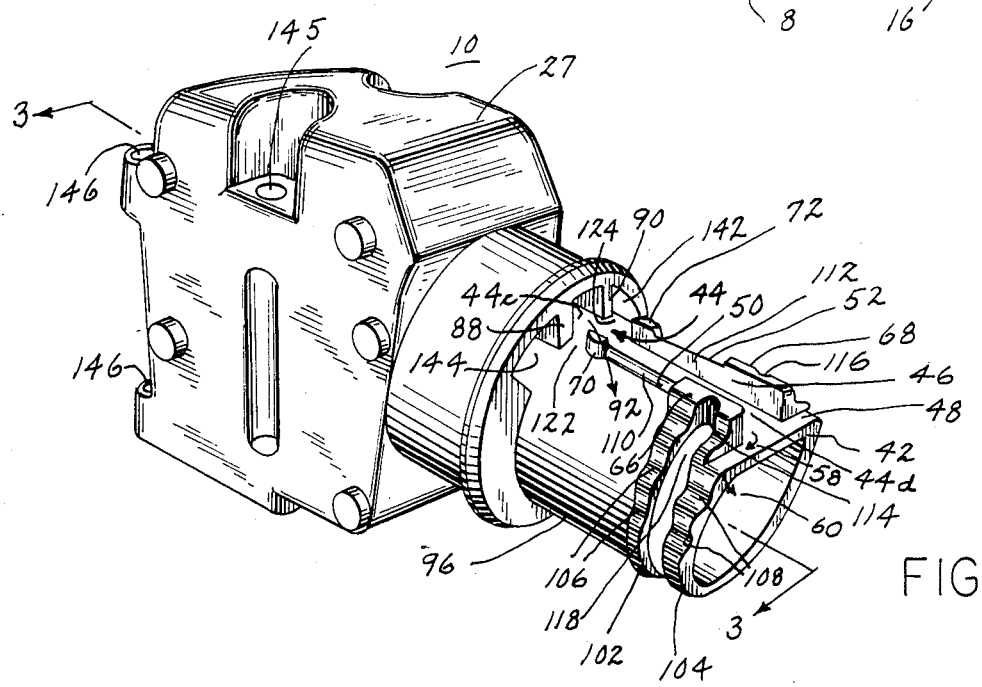
FIG. 2 is a perspective view of an exhaust elbow constructed in accordance with the invention.
Figure 3:
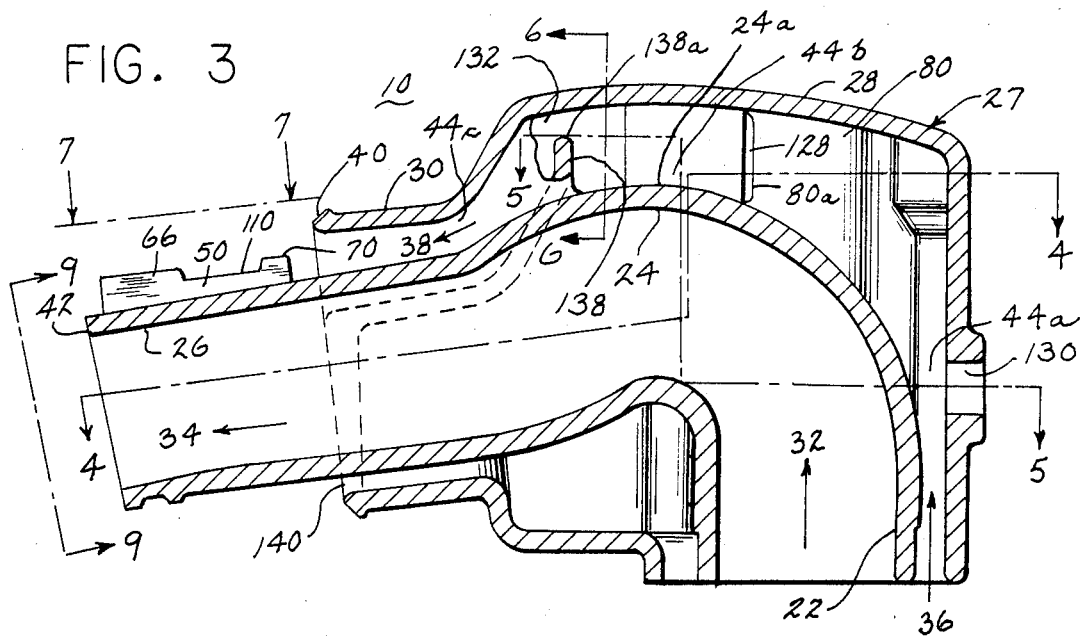
FIG. 3 is a sectional view taken along line 3—3 of FIG. 2.

As illustrated in FIGS. 2 and 3, the elbow includes an intake exhaust passage 22 extending upwardly from the engine and communicating through a top bend 24 with a discharge exhaust passage 26 which extends slightly downwardly, at about a 7° angle from the horizontal. An outer water jacket 27 is around the exhaust passages and generally has a first pocket 28 around intake exhaust passage 22, and a second pocket 30 around discharge exhaust passage 26. Exhaust flows from the engine upwardly as shown at arrow 32 and then around bend 24 and is discharged as shown at arrow 34. Coolant water flows from the engine upwardly as shown at arrow 36 and exits water jacket 26 as shown at arrow 38. Water jacket 26 terminates at end 40 upstream of the discharge end tip 42 of discharge exhaust passage 26. Exhaust tube 12, FIG. 1, is connected by a band clamp or the like around end 40 of the water jacket and extends externally downstream from the water jacket around discharge exhaust passage 26, for discharging the water and exhaust through transom 14 of the boat.

Central channel means 44, FIG. 2, extends longitudinally along the exterior of discharge exhaust passage 26 to guide water therealong in the water jacket and then externally of the water jacket to the end 42 of discharge exhaust passage 26 to mix with exhaust thereat from arrow 34. The mixed combustion product exhaust and coolant water is then discharged through exhaust tube 12, FIG. 1.

Means are provided for maintaining the end tip 42 of discharge exhaust passage 26 substantially dry to prevent water ingestion and creeping back into discharge exhaust passage 26, and eventually back into the engine, due to pulsations of the engine. Transition means 46 at the end 48 of passage 26 creates an outward draw from central channel 44 to minimize breakup of outward longitudinal water flow from channel 44 at end tip 42 which may otherwise deposit water or enable moisture collection at end tip 42. Central channel 44 is formed by a pair of side walls 50 and 52 extending longitudinally along the exterior of passage 26, and transition means 46 comprises portions of the sidewalls which are laterally tapered away from each other at 54 and 56, FIG. 7, at the outer end 48 of discharge exhaust passage 26. Without the taper at 54 and 56, it was generally found that water flow in central channel 44 began to break up before it reached end 48, or would tend to fan out when it reached end 48 and for example creep around laterally at 58 and then inwardly at 60 into exhaust passage 26. This premature break-up or fanning out or inward creeping is found to be eliminated with the present structure.

The interior of discharge exhaust passage 26, FIG. 4, has a first portion 62 and a second portion 64 downstream of the first portion and generally aligned in cross-section with tapered sidewalls 54 and 56. Interior portion 64 is laterally tapered outwardly such that first portion 62 has a smaller cross sectional area than interior portion 64 to break-up ingestion pulsations back into discharge exhaust passage 26 to further prevent water ingestion.

Sidewalls 50 and 52 have downstream end portions 66 and 68 having a greater height than upstream portions 70 and 72. Central water flow channel 44 deepens as it progresses downstream.

Central channel 44 has an initial section 44a in water jacket 27, FIGS. 3 and 4, extending upwardly along the exterior of intake exhaust passage 22. Central channel 44 continues in section 44b in the water jacket around the top of bend 24. Central channel 44 continues in water jacket 27 at section 44c along the top exterior of discharge exhaust passage 26 within the water jacket, FIGS. 2, 3 and 5. Finally, central channel 44 continues at section 44d, FIG. 2, external of water jacket 27 and extending longitudinally along the exterior of discharge exhaust passage 26 downstream of water jacket 27. Central channel section 44a is formed by sidewall sections 76 and 78 and by sidewall sections 80 and 82 between the water jacket and the exhuast passage, FIG. 4. Central channel section 44b is formed by sidewall sections 80 and 82 as a transition thereto and by sidewall sections 84 and 86, FIGS. 4 and 5. Central channel section 44c is formed by sidewall sections 88 and 90, FIGS. 5 and 2. Central channel section 44d external of water jacket 27 is formed by sidewall 50 and 52.

Sidewall sections 88 and 90 in the water jacket at the downstream end of the latter have a greater height than the upstream portions 70 and 72 of the sidewalls 50 and 52 external to the water jacket. Water in central channel 44 exiting water jacket 27 at arrow 38, FIG. 3, is thus split into a first path continuing longitudinally through the central channel at 44d between the lower height sidewall portions 70 and 72 along the exterior of discharge exhaust passage 26, and a second path laterally and longitudinally overflowing the lower height sidewall portions 70 and 72 at arrows 92 and 94, FIGS. 2 and 7, to flow along and cool the exterior surfaces 96 and 98 of discharge exhaust passage 26 external to water jacket 27 and within bellows tube 12.

A pair of rings 102 and 104, FIG. 2, extend around the end 48 of discharge exhaust passage 26 to retard the flow of water therepast in exhaust tube 12. Ribbed grooves such as 106 and 108 are formed in the rings permitting limited flow across the rings to provide flow at idle.

The sidewall sections 50 and 52, FIGS. 2, 3 and 7, of the central channel section 44d external to water jacket 27 have first, second and third portions. The first portions 70 and 72 face and have a lesser height than sidewall sections 88 and 90 in the water jacket, as above noted. Second portions 110 and 112 extend between and have a lesser height than first and third portions 70 and 66 and first and third portions 72 and 68, respectively. Third portions 66 and 68 are proximate the end 48 of the discharge exhaust passage 26 and are tapered laterally away from each other at 54 and 56, FIG. 7, and have a greater height than first portions 70 and 72. Water in the central channel section 44c exiting water jacket 27 is split into the noted first and second paths by first portions 70 and 72. Water also flows longitudinally along the top of and also laterally across second portions 110 and 112. Rings 102 and 104 extend laterally from the third portions 66 and 68. The third portions 66 and 68 have respective middle sections 114 and 116 enabling water overflow from respective sidewall third portions 66 and 68 laterally between the rings at 118 and 120, FIGS. 2 and 7.

Sidewall first portions 70 and 72 are spaced by gaps 122 and 124 from sidewall sections 88 and 90 in water jacket 27. Some of the water in central channel section 44c exiting from water jacket 27 flows laterally through gaps 122 and 124 to flow along and cool the exterior surfaces 96 and 98 of discharge exhaust passage 26 external to water jacket 27.

A first pair of ports 126 and 128, FIGS. 3 and 4, are provided between central channel 44 and the water jacket pockets 28a and 28b for communicating water from the central channel to the pockets for cooling the exhaust passage. Central channel sidewalls 80 and 82 provide a first pair of dams between ports 128 and 126 and central channel 44a and 44b for directing initial water flow along the central channel, such that at idle, water flows through the central channel 44 to the end 42 of discharge exhaust passage 26 rather than into water jacket pockets 28a and 28b. This allows faster heating of the exhaust passage, particularly the upwardly extending intake exhaust passage 22, and in turn minimizes condensation within the elbow which may otherwise ingest back into the engine. Also, during warm-up, it is sometimes common to provide water flow through a port such as 130, FIG. 3, into the elbow water jacket 27 to mix with the exhaust at discharge tip end 42. Sidewalls 80 and 82 likewise direct such initial warm-up water flow through the central channel rather than into water jacket pockets 28a and 28b, thus providing faster heating of the exhaust elbow and minimizing condensation therein.

Sidewalls 80 and 82 define a portion of the central channel therebetween, particularly the transition between 44a and 44b. Sidewalls 80 and 82 also define the laterally outwardly spaced side pockets 28b and 28a in the water jacket on distally opposite faces of sidewalls 80 and 82. Sidewalls 80 and 82 provide first dam means and extend longitudinally generally from intake exhaust passage 22 and terminate proximate the bend 24. The terminating ends 80a and 82a of the sidewalls define respective ports 128 and 126 such that water initially flows longitudinally through central channel sections 44a and 44b between sidewalls 80 and 82 and continues longitudinally through the central channel, and such that at higher water volumes, water additionally flows laterally around terminating ends 80a and 82a and laterally into ports 128 and 126 and into side water jacket pockets 28b and 28a. Ports 126 and 128 are below and upstream of the top 24a of the bend. Sidewalls 80 and 82 extend laterally inwardly towards each other at 80b and 82b.

A second set of ports 132 and 134, FIGS. 3 and 6, are provided between central channel section 44b and water jacket side pockets 30d and 30c, FIG. 5. Second dam means is provided by walls 136 and 138, FIGS. 2, 5 and 6, extending from opposing sides of the central channel at 44b and 44c formed by sidewalls 88 and 90 and having top surfaces 136a and 138a higher than the top 24a of the bend such that water initially flows longitudinally through the central channel at 44b and 44c, with some residual flow into water jacket side pockets 30a and 30b. Restricted outward flow from water jacket side pockets 30a and 30b is provided through exit passage 140, FIG. 9. At higher water volume, water additionally flows over walls 136 and 138 at 136a and 138a into water jacket side pockets 30c and 30d. Walls 136 and 138 are downstream of the top 24a of the bend. The second set of ports 132 and 134 are above and downstream of the top 24a of the bend. Walls 136 and 138 extend generally laterally outwardly away from each other from opposing sides of central channel section 44c at channel sidewalls 90 and 88. Outward flow from overflow water jacket side pockets 30c and 30d is provided through passages 142 and 144, respectively, FIG. 9.

Elbow 10 is preferably formed as an integral unit by means of lost foam molding. Mounting holes 145-148, FIGS. 4 and 2, are provided for bolting the elbow to the manifold of the engine.

It is recognized that various alternatives and modifications are possible within the scope of the appended claims.

What is claimed is:

1. In a marine propulsion system having an internal combustion engine exhausted through a water jacketed exhaust elbow, an improved exhaust elbow comprising:
    an intake exhaust passage communicating through a bend with a discharge exhaust passage;
    water jacket means around said exhaust passages;
    central channel means extending longitudinally along the exterior of said discharge exhaust passage to guide water therealong in said water jacket means to the end of said discharge exhaust passage to mix with exhaust thereat; and
    means for maintaining the end tip of said discharge exhaust passage dry to prevent water ingestion and creeping back into said discharge exhaust passage due to pulsations of said engine, said last mentioned means comprising transition means at the end of said central channel means creating an outward draw from said central channel means to minimize break-up of outward water flow from said central channel means at said end tip of said discharge exhaust passage which may otherwise deposit water on said end tip of said discharge exhaust passage.

2. The invention according to claim 1 wherein said central channel means is formed by a pair of sidewalls extending longitudinally along the exterior of said discharge exhaust passage, said sidewalls being laterally tapered away from each other at the outer end of said discharge exhaust passage.

3. The invention according to claim 2 wherein the interior of said discharge exhaust passage has first and second portions, said second interior portion being downstream of said first interior portion and generally aligned in cross section with said outer end of said discharge exhaust passage where said sidewalls taper away from each other, said first interior portion having a smaller cross sectional area than said second interior portion to break up ingestion pulsations back into said discharge exhaust passage toward said engine to further prevent water ingestion.

4. The invention according to claim 3 wherein each of said sidewalls has a downstream portion and an upstream portion, said downstream portions of said sidewalls having a greater height than said upstream portions of said sidewalls.

5. In a marine propulsion system having an internal combustion engine exhausted through a water jacketed exhaust elbow, an improved exhaust elbow comprising:
    an intake exhaust passage communicating through a bend with a discharge exhaust passage;
    water jacket means around said exhaust passages and terminating upstream of the end of said discharge exhaust passage;
    central channel means formed by sidewall sections within said water jacket means extending longitudinally along the exterior of said discharge exhaust passage, and formed by sidewall sections external of said water jacket extending longitudinally along the exterior of said discharge exhaust passage downstream of said water jacket means, said central channel means guiding water therealong in said water jacket means to the end of said discharge exhaust passage to mix with exhaust thereat; and
    means for maintaining the end tip of said discharge exhaust passage dry to prevent water ingestion and creeping back into said discharge exhaust passage due to pulsations of said engine, said last mentioned means comprising transition means at the end of said central channel means creating an outward draw from said central channel means to minimize break-up of outward water flow from said central channel means at said end tip of said discharge exhaust passage which may otherwise deposit water on said end tip of said discharge exhaust passage.

6. The invention according to claim 5 wherein said sidewall sections external of said water jacket have end portions laterally tapered away from each other.

7. The invention according to claim 6 wherein said sidewall sections in said water jacket at the doswnstream end of the latter have a greater height than the upstream portions of said sidewall sections external to said water jacket such that water in said central channel means exiting said water jacket is split into a first path continuing longitudinally through said central channel means between said lower height sidewalls along the exterior of said discharge exhaust passage, and a second path laterally and longitudinally overflowing over said lower height sidewalls to flow along and cool the exterior surface of said discharge exhaust passage external to said water jacket.

8. The invention according to claim 7 comprising an exhaust tube around said discharge exhaust passage external to said water jacket and extending from the downstream end of said water jacket and discharging said water and exhaust.

9. The invention according to claim 8 comprising one or more rings formed around the end of said discharge exhaust passage to retard the flow of water therepast in said exhaust tube, and comprising ribbed grooves in said rings permitting limited flow across said rings to provide flow at idle.

10. The invention according to claim 8 wherein said sidewall sections of said central channel means external to said water jacket have first, second and third portions, said first portions facing and having a lesser height than said last mentioned sidewall sections in said water jacket, said second portions extending between and having a lesser height than said first and third portions, said third portions being proximate said end of said discharge exhaust passage and being tapered laterally away from each other and having a greater height than said first portions, such that water in said central channel means exiting said water jacket is split into first and second paths by said first portions, water also flowing longitudinally along the top of and also laterally and longitudinally across said second portions.

11. The invention according to claim 10 comprising a pair of rings around the end of said discharge exhaust passage extending laterally from said third portions of said sidewall sections external to said water jacket.

12. The invention according to claim 11 wherein said sidewall third portions have middle sections of reduced lateral width enabling water overflow from said sidewall third portions laterally between said rings.

13. The invention according to claim 10 wherein said sidewall first portions are spaced by a gap from said sidewall sections in said water jacket, such that some of the water in said central channel means exiting said water jacket may flow laterally through said gap to flow along and cool the exterior surface of said discharge exhaust passage external to said water jacket.

14. In a marine propulsion system having an internal combustion engine exhausted through a water jacketed exhaust elbow, an improved exhaust elbow comprising:
exhaust passage means comprising an intake exhaust passage extending from said engine and communicating through a bend with a discharge exhaust passage;
water jacket means having pocket means around said exhaust passage means for cooling the latter;
central channel means extending longitudinally along the exterior of said intake exhaust passage and then longitudinally along the exterior of said bend and then longitudinally along the exterior of said discharge exhaust passage to guide water therealong in said water jacket means to the end of said discharge exhaust passage to mix with exhaust thereat;
port means between said central channel means and said pocket means for communicating water from the former to the latter for cooling said exhaust passage means; and
dam means between said port means and said central channel means for directing initial water flow along the latter, such that at idle, water flows through said central channel means to the end of said discharge exhaust passage rather than into said pocket means, thus allowing faster heating of said exhaust passage means and in turn minimizing condensation within said elbow which may otherwise ingest back into said engine.

15. The invention according to claim 14 wherein said dam means comprises sidewalls in said central channel means defining said central channel means laterally inwardly therebetween and defining laterally outwardly spaced side pockets in said side pocket means of said water jacket on distally opposite faces of said sidewalls, said sidewalls extending longitudinally generally from said intake exhaust passage and terminating proximate said bend, said terminating end of said sidewalls defining said port means such that water initially flows longitudinally through said central channel means between said sidewalls and continues longitudinally through said central channel means to said end of said discharge exhaust passage to mix with exhaust thereat, and such that at higher water volumes, water additionally flows laterally around said terminating ends of said sidewalls and laterally into said port means and into said laterally outwardly spaced side pockets of said water jacket means.

16. The invention according to claim 15 wherein said sidewalls also have portions extending laterally inwardly towards each other.

17. The invention according to claim 14 wherein said intake exhaust passage extends upwardly and communicates with a top said bend, and wherein said dam means comprises a pair of walls extending from opposing sides of said central channel means and having a top surface at a height higher than the top of said bend such that water initially flows longitudinally through said central channel means, and such that at higher water volumes, water additionally flows over said walls.

18. The invention according to claim 17 wherein said walls are downstream of said top of said bend.

19. In a marine propulsion system having an internal combustion engine exhausted through a water jacketed exhaust elbow, an improved exhaust elbow comprising:
an intake exhaust passage extending upwardly from said engine and communicating through a top bend with a discharge exhaust passage;
water jacket means having first and second pocket means respectively around said intake exhaust passage and said discharge exhaust passage for cooling same;
central channel means extending longitudinally upwardly along the exterior of said intake exhaust passage and then longitudinally along the top exterior of said bend and then longitudinally along the top exterior of said discharge exhaust passage to guide water therealong in said water jacket means to the end of said discharge exhaust passage to mix with exhaust thereat;
first and second port means between said central channel means and respective said first and second pocket means for communicating water from the former to the latter for cooling said exhaust passages, said first port means being below and upstream of the top of said bend, said second port means being above and downstream of the top of said bend;
first and second dam means between said central channel means and respective said first and second port means for directing initial water flow along said central channel means, such that at idle water flows through said central channel means to the end of said discharge exhaust passage rather into said first and second pocket means, thus allowing faster heating of said exhaust passages and in turn minimizing condensation within said elbow which may otherwise ingest back into said engine,
said first dam means comprising sidewalls in said central channel means defining said central channel means laterally inwardly therebetween and defining laterally outwardly spaced side pockets of said first pocket means on distally opposite faces of said sidewalls, said sidewalls extending longitudinally generally from said intake exhaust passage and terminating proximate and downstream of the top of said bend, said terminating ends of said sidewalls defining said first port means such that water initially flows longitudinally through said central channel means between said sidewalls and continues longitudinally through said central channel means to said end of said discharge exhaust passage to mix with said exhaust, and such that at higher water volumes, water additionally flows laterally around said terminating ends of said sidewalls and laterally into said first port means and into said laterally outwardly spaced side pockets of said first pocket means of said water jacket means,
said second dam means comprising a pair of walls proximate and downstream of the top of said bend and extending generally laterally outwardly away from each other from opposing sides of said central channel means and having top surfaces at a height higher than said top of said bend such that water initially flows longitudinally through said central channel means, and such that at higher water volume, water additionally flows over said last mentioned pair of walls.

20. In a marine propulsion system having an internal combustion engine exhausted through a water jacketed exhaust elbow, an improved exhaust elbow comprising:

exhaust passage means comprising an intake exhaust passage extending from said engine and communicating through a bend with a discharge exhaust passage;

water jacket means having pocket means around said exhaust passage means for cooling the latter;

central channel means extending longitudinally along the exterior of said intake exhaust passage and then longitudinally along the exterior of said bend and then longitudinally along the exterior of said discharge exhaust passage to guide water therealong in said water jacket means to the end of said discharge element passage to mix with exhaust thereat, said central channel means including a pair of sidewalls extending longitudinally along the exterior of said discharge exhaust passage and laterally tapered away from each other at the outer end of said discharge exhaust passage to create an outward draw from said central channel means to minimize break-up of outward water flow from said central channel means at the end tip of said discharge exhaust passage which may otherwise deposit water on said end tip of said discharge exhaust passage, to maintain said end tip of said discharge exhaust passage dry and prevent water ingestion and creeping back into said discharge exhaust passage due to pulsations of said engine;

port means between said central channel means and said pocket means for communicating water from the former to the latter for cooling said exhaust passage means; and dam means between said port means and said central channel means for directing initial water flow along the latter such that at idle water flows through said central channel means to the end of said discharge exhaust passage rather than into said pocket means, thus allowing faster hearing of said exhaust passage means and in turn minimizing condensation within said elbow which may otherwise ingest back into said engine.

21. The invention according to claim 20 wherein:

said water jacket means terminates upstream of said end of said discharge exhaust passage;

said intake exhaust passage extends upwardly from said engine and communicates with a top said end;

said central channel means is formed by sidewall sections within said water jacket means extending longitudinally upwardly along the exterior of said intake exhaust passage and then longitudinally around the top of said bend and then longitudinally along the exterior of said discharge exhaust passage, and formed by sidewall sections external of said water jacket means and extending longitudinally along the exterior of said discharge exhaust passage downstream of said water jacket means;

said elbow includes an exhaust tube around said discharge exhaust passage external to said water jacket means and extending from the downstream end of said water jacket means and discharging said water and exhaust;

said sidewall sections in said water jacket means at the downstream end of the latter have a greater height than the upstream portions of said sidewall sections external to said water jacket means such that water in said central channel means exiting said water jacket means is split into a first path continuing longitudinally through said central channel means between said lower height sidewalls along the exterior of said discharge exhaust passage, and a second path laterally and longitudinally overflowing over said lower height sidewalls to flow along and cool the exterior surface of said discharge exhaust passage external to said water jacket means;

said water jacket means has first and second pocket means around respective said intake exhaust passage and discharge exhaust passage;

first and second port means between said central channel means and respective said first and second pocket means for communicating water from the former to the latter for cooling said exhaust passages, said first port means being below and upstream of the top of said bend, said second port means being above and downstream of the top of said bend;

first and second dam means between said central channel means and respective said first and second port means for directing initial water flow along said central channel means, such that at idle water flows through said central channel means to the end of said discharge exhaust passage rather into said first and second pocket means, thus allowing faster heating of said exhaust passages and in turn minimizing condensation within said elbow which may otherwise ingest back into said engine, said first dam means comprising sidewalls in said central channel means defining said central channel means laterally inwardly therebetween and defining laterally outwardly spaced side pockets of said first pocket means on distally opposite faces of said sidewalls, said sidewalls extending longitudinally generally from said intake exhaust passage and terminating proximate and downstream of the top of said bend, said terminating ends of said sidewalls defining said first port means such that water initially flows longitudinally through said central channel means between said sidewalls and continues longitudinally through said central channel means to said end of said discharge exhaust passage to mix with said exhaust, and such that at higher water volumes, water additionally flows laterally around said terminating ends of said sidewalls and laterally into said first port means and into said laterally outwardly spaced side pockets of said first pocket means of said water jacket means, said second dam means comprising a pair of walls proximate and downstream of the top of said bend and extending generally laterally outwardly away from each other from opposing sides of said central channel means and having top surfaces at a height higher than said top of said bend such that water initially flows longitudinally through said central channel means, and such that at higher water volume, water additionally flows over said last mentioned pair of walls.

* * * * *